UNITED STATES PATENT OFFICE.

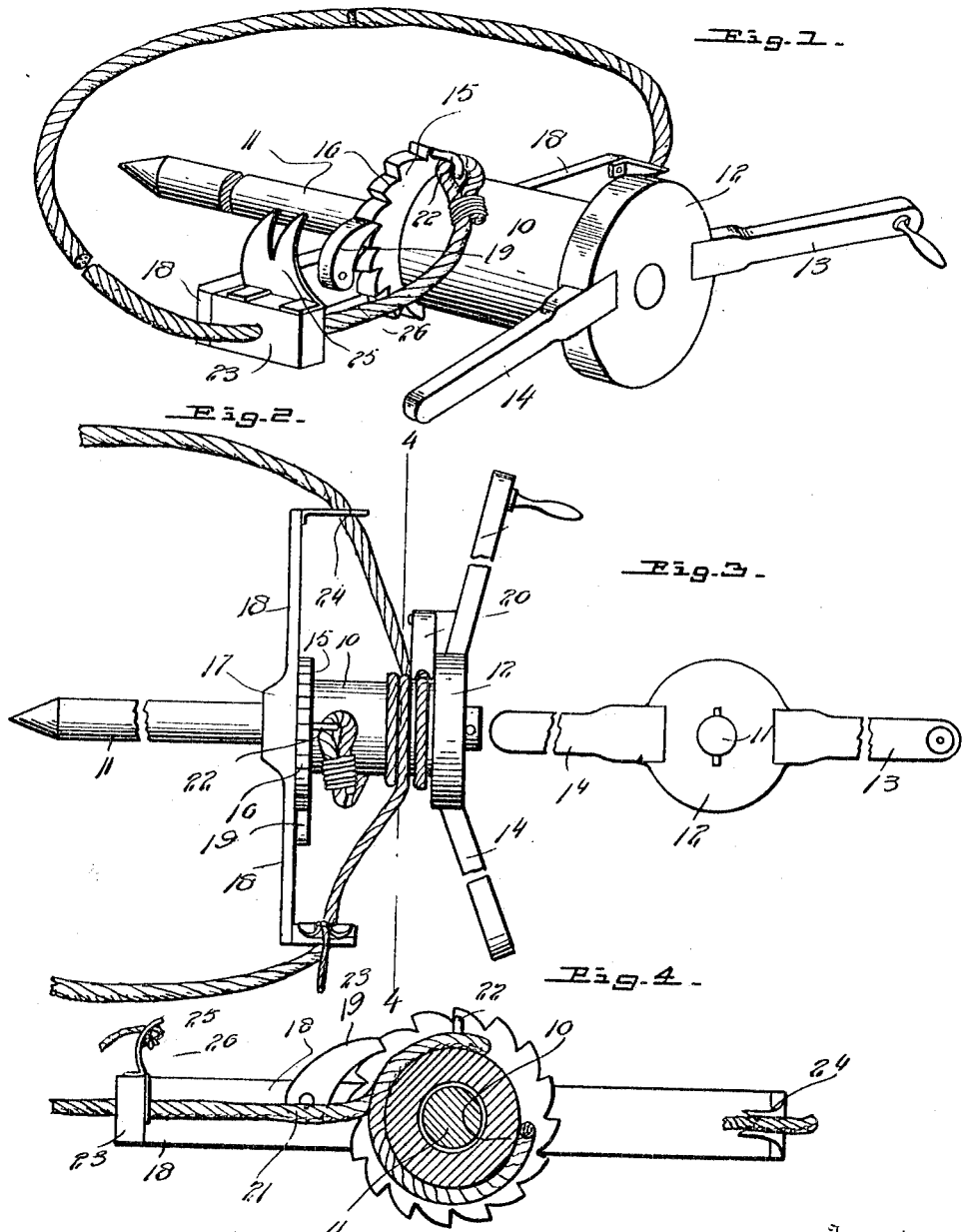

ROMAN L. MILLER, OF MECHANICSVILLE, IOWA.

SHOCK-COMPRESSOR.

1,115,085.  Specification of Letters Patent. Patented Oct. 27, 1914.

Application filed May 26, 1914. Serial No. 841,086.

*To all whom it may concern:*

Be it known that I, ROMAN L. MILLER, a citizen of the United States, residing at Mechanicsville, in the county of Cedar, State of Iowa, have invented certain new and useful Improvements in Shock-Compressors; and I do hereby declare the following to be a full, clear, and exact description of the invention, such as will enable others skilled in the art to which it appertains to make and use the same.

This invention relates to improvements in compressing devices, and particularly to devices for compressing shocks of fodder or the like so as to facilitate the ready application and tying of the binder twine.

The principal object of the invention is to provide a simple device of this character which is easy of operation and which will effectively compress and hold a shock so that the binder twine can be readily passed therearound and tied.

Other objects and advantages will be apparent from the following description, when taken in connection with the accompanying drawings.

In the drawings: Figure 1 is a perspective view of the device in operative position. Fig. 2 is a top plan view of the device. Fig. 3 is an end view. Fig. 4 is a vertical sectional view on the line 4—4 of Fig. 3.

Referring particularly to the accompanying drawing, 10 represents a winding drum which is rotatably mounted on a shaft or pin 11, this pin having one end suitably sharpened for penetration into a shock. One end of the drum carries a flange 12 and the integrally formed and radially extending handle members 13 and 14. At the opposite end of the drum is a flange 15 formed with ratchet teeth 16. Detachably mounted on the shaft 11 outwardly of the flange 15 is a member 17 which has the oppositely radiating arms 18. One of these arms carries a pivoted gravity pawl 19 engaging with the teeth of the flange 15. Pivotally mounted on the handle member 13 is a wedge clamp 20 which is adapted to bear against the compressor rope 21. This rope is secured at one end to an eye 22 formed on the drum, and has its other end passed through an opening in a block 23 carried on the outer end of the arm 18 which carries the pawl 19. The outer end of the other arm 18 carries a pair of inwardly directed and spaced fingers 24 between which is passed the unattached end of the rope or binder cable 21. Extending from one side of the block 23 are the claws 25 between which is held the knotted end of the binder twine 26. The inner edge of one of these claws 25 is sharpened so that the twine may be cut off after being passed around the shock to permit of grasping both ends of the twine and tying the same.

In the operation of the device the pointed end of the shaft 11 is driven into the shock until the member 17 rests thereagainst. The rope 21 is then passed around the shock and the free end engaged under the wedge clamp 20. Then upon rotating the drum by means of the handle members 13 and 14, the rope will be wound on the drum from opposite sides and the shock compressed. The pawl 19 will hold the drum and permit the binder twine to be readily passed therearound and tied. By releasing the pawl 19, the unattached end of the rope 21 can be quickly disengaged from the clamp 20 and the device removed from the shock. The shock is thus effectively tied and will properly stand alone.

By holding the loose end of the cable under the clamp 20 the cable will be drawn equally from both ends, thus producing a better compressed shock than when only one end is pulled.

What is claimed is:

1. A shock compressor comprising a shock penetrating member, a rotatable drum mounted thereon, a compressing cable having one end secured to the drum and adapted to be wound thereon, a member mounted on the shock penetrating member and provided with radial arms, a guide carried by one of the arms and receiving the cable therethrough, a ratchet flange carried by the drum, a pawl carried by the arm and engaging the ratchet, means carried by the drum for rotation thereof, a pair of spaced fingers carried by the other arm for guidance of the outer end of the compressor cable, and drum carried means for holding said last named end of the cable.

2. A shock compressor comprising a shock penetrating member, a compressor rope carrying drum mounted on the penetrating member, a compressor rope secured at one end to and wound on the drum, means for rotating the drum, and a pivoted clamp carried by the drum for holding the other end of the said rope whereby when the drum is rotated both ends of the rope will be drawn equally.

In testimony whereof, I affix my signature, in the presence of two witnesses.

ROMAN L. MILLER.

Witnesses:
WILL HENDERSON,
H. E. GIBEAUT.